July 30, 1929. H. HUBER 1,722,575
AUTOMATIC WOODWORKING MACHINE
Filed Sept. 2, 1925    4 Sheets-Sheet 3
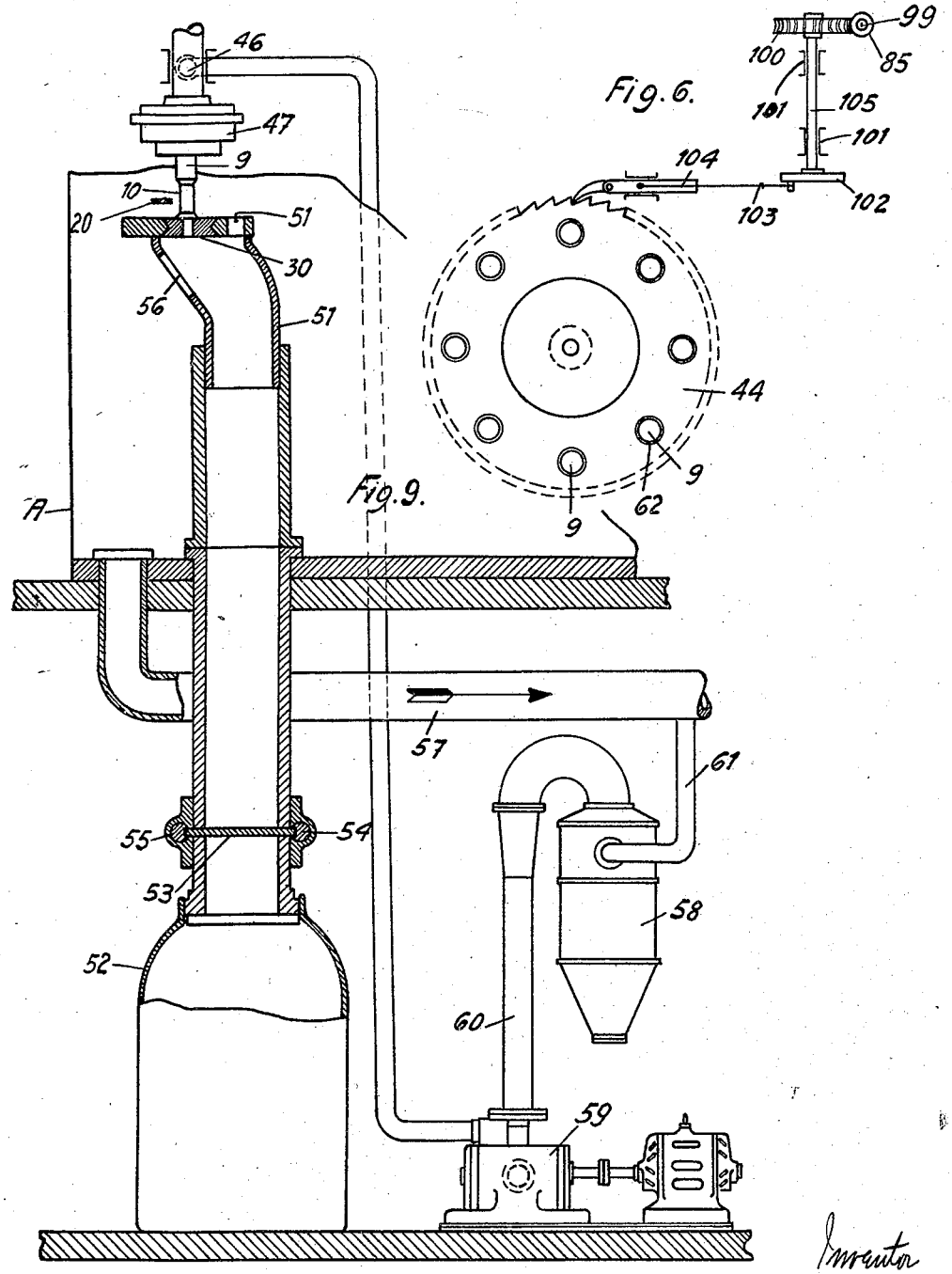

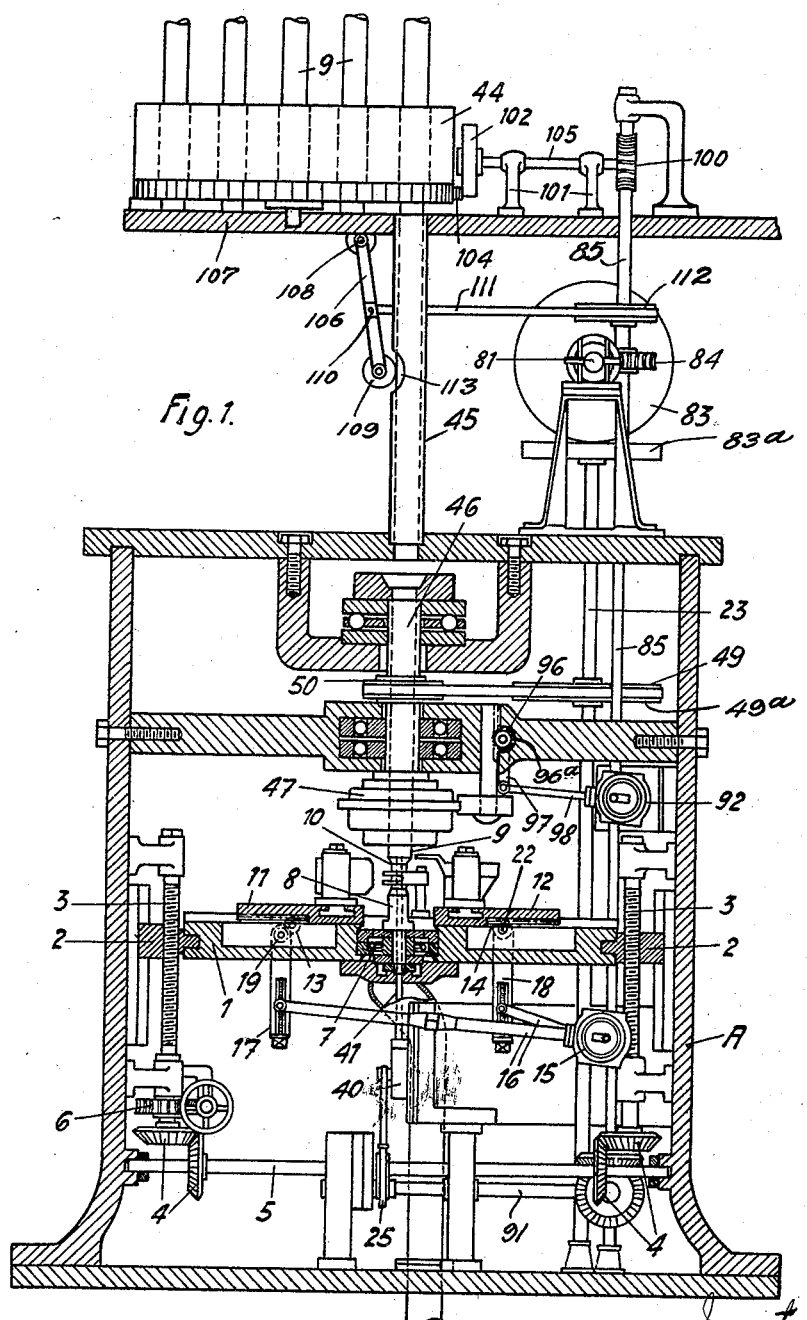

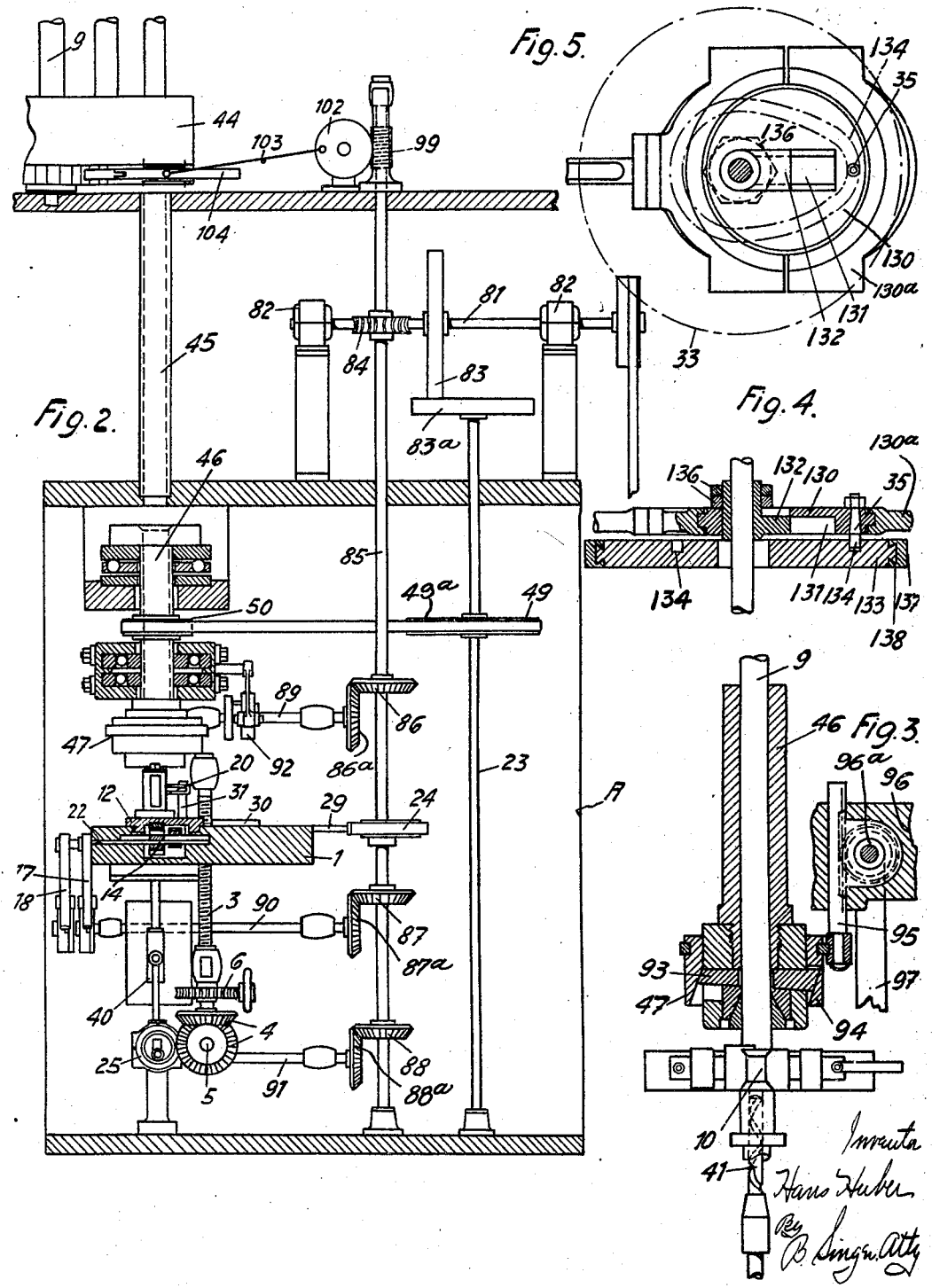

July 30, 1929.  H. HUBER  1,722,575
AUTOMATIC WOODWORKING MACHINE
Filed Sept. 2, 1925  4 Sheets-Sheet 4
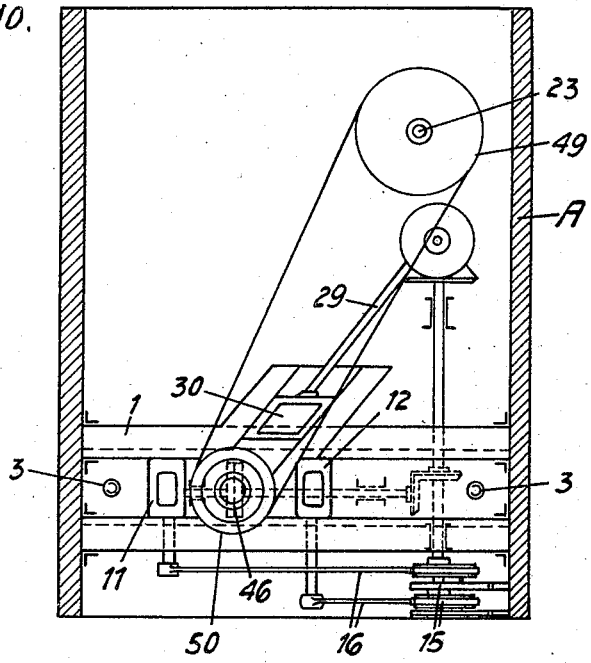
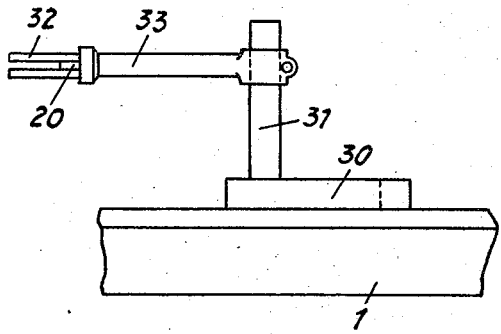
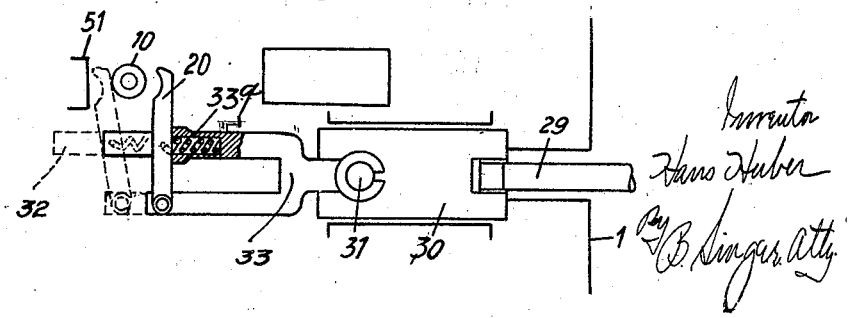

Patented July 30, 1929.

1,722,575

UNITED STATES PATENT OFFICE.

HANS HUBER, OF RUSCHLIKON, NEAR ZURICH, SWITZERLAND.

AUTOMATIC WOODWORKING MACHINE.

Application filed September 2, 1925, Serial No. 54,122, and in Switzerland, September 4, 1924.

The present invention relates to a new and improved machine for manufacturing bobbins, for sewing thread spools and like articles of wood.

The main object of the invention is to provide a machine for producing such articles in very great quantities with little manual labor at the shortest possible time.

I attain this and other objects which will be more particularly pointed out in the specification hereinafter by means of an automatic machine.

This invention relates to machines for automatically manufacturing bobbins, spools and like articles and is of the kind wherein the material to be operated upon is fed by gravity through a tube to the tools which are shifted to and from the material by shaft operated means, and wherein a chuck which is also shaft operated and disposed on the tube, alternately grips the material during the working or shaping operation and releases the material for gravity feed to the tools for the subsequent working operation.

The machine constructed according to the present invention includes the distinctive features that the bar is supported by means of a freely rotatable support say in the form of a stud which is mounted on a horizontal table which may be adjustably arranged on the frame of the machine, said stud and table being centrally bored in order to permit the passage of a drill for the workpiece, and means being provided for positively shifting the finished workpiece.

The means for shifting the workpiece is preferably driven by the shaft which actuates the tool shifting means and the chuck and the movement of the drill is also preferably controlled by the same shaft. The drill may be arranged to bore the end of the material a greater depth than the workpiece and thus when the material drops for the next shaping operation of its end the point of the drill will enter the recess formed and center the material.

The nature, characteristic features and the scope of my invention will be more fully understood from the following description, taken in connection with the accompanying drawings forming part hereof, and in which:—

Figs. 1 and 2 are sectional side elevations of the automatic machine, the illustrations being partly diagrammatic, Fig. 3 shows the chuck and part of its operating mechanism partly in section, Figs. 4 and 5 show in section and in a side elevation a cam to operate the tools, Fig. 6 shows the gear to feed the magazine, Figs. 7 and 8 show the means to remove the finished articles, Fig. 9 illustrates in a diagrammatic way pneumatic means to remove the cuttings, etc.

Fig. 10 is a diagrammatic plan of a modified construction of the machine, partly in section.

The machine shown in the drawings comprises a frame A, in which two screw-threaded shafts 3 are journalled. On each shaft 3 a nut 2 is arranged, which nuts 2 support horizontal table 1. The shafts 3 are interconnected by a cross shaft 5 and bevel gears 4. One of the shafts 3 is provided with a worm wheel 6 which is driven by means of a hand wheel and a worm. By turning the hand wheel the shafts 3 are simultaneously rotated and the table 1 is lifted or lowered. The table 1 is provided with a recess in which a ball bearing 7 is arranged. The ball bearing is preferably enclosed to exclude dust etc. One part of the bearing is fixed to the table 1 while the rotary portion of the bearing is provided with a stud 8 supporting the lower end of a bar 9 to be worked. The stud 8 is provided with a central bore and within said bore a drill 41 is rotatably and slidably mounted, which drill 41 has to make the central bore in the bobbin made from the lower end portion of the bar 9 as described hereinafter. In the table 1 guide slots are arranged running in radial direction to the bearing 7. In the said guide slots slides 11, 12 are slidably mounted and on the said slides 11, 12 the requisite tools to work the bar 9 are removably fixed. The tools may have any suitable shape necessary to give to the work the desired shape. On the lower side the slides 11, 12 are provided with racks meshing with pinions 13, 14 respectively. The pinion 13 engages an intermediate gear 19. The pinions 19, 14 are keyed to shafts journalled in the table 1 and provided each with an arm 17 or 18 respectively. Each arm 17, 18 is provided with a longitudinal slot and in each slot a screw-threaded spindle is journalled adapted to be rotated by a key. On each of the spindles a nut is arranged carrying a stud and to each stud a rod 16 is linked moved by an eccentric 15. It will be seen that the eccentric 15 reciprocates the slides 11, 12 to and from the bar 9 but in opposite directions to each other. The tools are therefore brought simultaneously to work on the bar 9 and are withdrawn together. To adjust the stroke of each tool the screw-threaded spindles of the arms 17, 18 are adjusted to vary the effective length of the arms 17, 18. To adjust the timing of the slides 11, 12 with reference to the bar 9 the length of the rods 16 may be varied by well known means for instance by a nut with right and left handed threads interconnecting correspondingly threaded portions of the bars 16.

To remove the finished bobbin 10 from the stud 8 after it has been cut-off from the bar 9 a finger 20 (Figs. 7 and 8) is arranged which is mounted on a slide 30 and is moved to and fro by an eccentric 24 fastened to a vertical shaft 85 (Fig. 2). By means of a rod 29 the said eccentric 24 moves the slide 30 in a guide groove of the table 1. On the slide 30 a vertical stud 31 is fixed on which a bifurcated holder 33 is rigidly supported. On one prong of the holder 33 the finger 20 is pivoted which finger moves in a slot 32 of the other prong of the holder. A coiled spring 33$^a$ arranged in a recess of the holder is attached to the finger 20 and also to the bottom of the recess and forms the abutment of the finger 20. When the slide 30 is pushed toward the bobbin 10 the impact of the finger on the bobbin 10 is lessened by the spring 33$^a$. When the bobbin 10 has been removed from the stud 8 the bar 9 drops under its own weight and comes to rest on stud 8. If now the slide 30 returns to its initial position the back of the finger 20 strikes against the bar 9 and moves against the action of spring 33$^a$ until it has passed the bar 9. The spring 33$^a$ returns the finger 20 to its position as shown in Fig. 7 as soon as slide 30 has returned to its initial position.

The machine is driven by a shaft 81 journalled in bearings 82 fixed to the frame A, by means of a suitable motor. On the shaft 81 a friction disk 83 is fastened which engages a friction disk 83$^a$ of a vertical shaft 23. On the shaft 23 a pulley 49$^a$ is fixed which drives by means of a belt 49 a pulley 50 of a sleeve 46 rotatably mounted in the frame A through which sleeve the bar 9 is fed as described hereinafter. On the shaft 81 a worm is fixed meshing with a worm wheel 84 keyed to a vertical shaft 85. On the shaft 85 three bevel gears 86, 87, 88 are fixed which respectively engage gears 86$^a$, 87$^a$, 88$^a$ on horizontal shafts 89, 90, 91 mounted in the frame A. In practice suitable gearings, not shown, are provided for these shafts. Said shafts drive respectively the eccentrics 92, 15 and 25. The eccentric 92 operates the chuck 47 by which the bar 9 is held fast in the sleeve 46 (Fig. 3). The chuck 47 comprises a bar 93 slidably mounted in horizontal direction within said chuck and bearing with two opposite faces on a tapering wall of a ring 94. The ring 94 is slidably mounted on the body of the chuck 47. A bar 95 engaging a ring fitted in an annular groove of the ring 94 is slidably mounted in a support and is provided with teeth with which a pinion 96 engages. On the shaft 96$^a$ to which the pinion 96 is fastened a lever 97 is attached, which lever is moved to and fro by the eccentric 92 of the shaft 89. The eccentric 15 drives, as described above, the slides 11, 12 and the eccentric 25 reciprocates a slide 40 in vertical direction on which slide the drill 41 is removably fixed.

Each one of the eccentrics 15, 23, 25 and 92 is constructed as shown in Figs. 4 and 5. The sheave 130 is provided with a radial slot 131 into which a radial arm 132 projects. The sheave 130 is movable in a radial direction on said arm 132 which is fastened to the driving shaft which may be either shaft 85, 89, 90 or 91. On the sheave 130 a strap 130$^a$ is mounted in the usual manner which is connected to either of the rods 16, 29 etc. Nuts 136 screwed to the boss of arm 132 keep the parts 130, 132 in engagement with each other. Beside the arm 132 a disk 133 is arranged in which a curved slot 134 is provided. Into the slot 134 a bolt 35 projects, rigidly fixed to the sheave 130. The disk 133 is rotatably mounted in a frame 137 by means of a flange 138 and is stationary during the operation of the machine and may be fixed in any desired adjusted position by some well known clamping or other means. Moreover the frame 137 may be moved with reference to the shaft by any suitable well known means not shown in the drawings. The shape of the curved slot may be made to suit requirement. By rotating the shaft the arm 132 partakes of its rotation and the sheave 130 turns also. At the same time the sheave 130 is moved in radial direction, the bolt 35 engaging the curved groove 134. By these means the straps and therewith the rods connected thereto receive a reciprocating movement depending on the shape of the groove 134. Each slide 11, 12, 40 etc. moves at different speed according to the work to be performed etc. by the tool mounted on it, the curved groove being shaped accordingly.

Above the sleeve 46 in which the bar 9 is held while it is rotated a stationary tube 45 is arranged through which the bars 9 are fed one by one to the sleeve 46. Above the tube 45 a magazine 44 is rotatably mounted, in which a number of bars 9 are held vertically in guides 62. These are brought one by one over the upper end of the tube 45 and fall successively through said tube 45 into the sleeve 46. To shift the magazine the latter is provided with a toothed rim with which meshes a pawl 104. The pawl 104 is attached to a rod 103 linked to a crank pin of a disk 102. A shaft 105 running in bearings 101 and on which the disk 102 is fastened carries a worm wheel 100 with which a worm 99 keyed to shaft 85 is in mesh.

The bar 9 is held fast in the chuck 47 which rotates at very high speed (at about 6000 revolutions per minute) being driven by shaft 23, the speed of which may be varied by moving the driving friction disk 83. The eccentric 15 moves the slides 11 and 12 and the tools mounted thereon are brought to work on the bar 9. The drill 41 is moved upwards by the eccentric 25 and the bobbin 10 is cut-off by a suitable tool on one of the slides 11, 12. The drill 41 is moved upwards so far that it passes beyond the bobbin formed and is returned so far that its point projects slightly above the face of the stud 8. Thus the bar 9 when falling down after the chuck 47 has been opened is centered by the point of the drill which enters in the recess formed previously in the bar 9 before the bobbin was cut-off. To ensure the falling of the bar 9 in the sleeve 46 in which the bar 9 has only very little play a vacuum is created at the lower end of the sleeve 46 by means of a vacuum pump 59. The vacuum created by said pump together with the weight of the bar 9 will be sufficient to move the bar 9. The vacuum created by the pump 59 is also used to suck off the cuttings and the dust. A pipe 57 is attached to the frame A at a suitable point which pipe is led to a dust collector 58 which is connected to the pump 59 by means of the pipe 60. This dust removing device does not differ from others which are already in use. With the pump 59 the finished bobbins are drawn away by means of a conduit 51. The upper end of said conduit 51 is open and the slide 30 with the finger 20 ends its travel above the opening 51 in such a manner that the bobbins 10 fall down the conduit 51 into a collecting receptacle 52. In the conduit a slide 53 is arranged running in guides 54. The slide 53 is manually operated and serves to close the conduit when the container 52 is removed. The conduit 51 is connected to the suction pump 59 to insure the fall of the bobbins and to remove the dust, etc.

Within the scope of my invention, the bars 9 may be moved by any suitable means.

In order that the material rods when falling down through the pipe 45 do not fall too quickly a braking action can be applied thereto while falling. A form of construction of such a brake is illustrated in Fig. 1. A single armed lever 106 is rotatably mounted on the table 107 at 108 and carries at its free end a roller 109. The lever 106 is hinged at 110 to the eccentric lever 111 which is connected to the eccentric 112 on the operating shaft 85 so that the lever 106 and thus also the roller 109 carries out a reciprocating movement. In the outermost position to the right of the roller 109 this presses, through the opening 113 in the pipe 45, upon the downwardly falling material rod and thus applies a braking action to the fall of the latter.

What I wish to secure by U. S. Letters Patent is:—

1. A machine to manufacture automatically articles of wood such as bobbins, spools and the like, comprising in combination a vertically arranged tube through which to feed a work bar of wood downwardly, a chuck to hold and relieve the bar, a rotary support for the work bar, a table in which said work support is mounted, positively driven slides mounted on said table movable in horizontal direction and each provided with a tool to work the bar, a positively driven drill movable in vertical direction, said drill being mounted below and independently of the table and adapted to bore the lower end of the work to aid the centering of the bar and to then descend to release the same, and means to remove the finished articles, said removing means being also slidably mounted on said table.

2. A machine to manufacture automatically articles of wood such as bobbins, spools and the like comprising in combination means to feed bars of wood downwardly, a chuck to hold the bar, a rotary support for the work bar, at least two positively driven slides, movable in horizontal direction each being provided with at least one tool to work the bar, a positively driven drill movable in vertical direction, said drill being adapted to aid the centering of the bar, means to remove the finished articles substantially as described and for the purpose set forth comprising a positively driven reciprocating slide, a pivotal finger on said slide adapted by a movement of the slide in one direction to strike against the bobbin formed on the bar and move beyond the original position of the bar, a spring attached to said finger which tends to hold and to return the finger to the initial position.

In witness whereof I affix my signature.

HANS HUBER.